Patented May 6, 1952

2,595,571

UNITED STATES PATENT OFFICE 2,595,571

AZO DYESTUFF DERIVATIVES AND PROCESS OF MAKING SAME

Charles Graenacher, Riehen, and Heinrich Bruengger, Basel, Switzerland, assignors to Ciba Limited, Basel, Switzerland, a Swiss firm No Drawing. Application May 20, 1949, Serial No. 94,516. In Switzerland June 2, 1948

9 Claims. (Cl. 260—152)

This invention relates to the manufacture of new valuable azo dyestuff derivatives and the application thereof in dyeing and printing.

The process for the manufacture of azo dyestuff derivatives in accordance with the present invention involves reacting 1 molecular proportion of an azo dyestuff which is free from solubilizing groups and contains the atom grouping

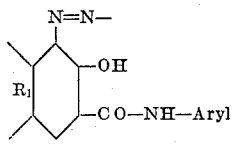

in which $R_1$ is a cyclic radical condensed with the benzene ring in the positions indicated by the valence bonds, with at least 2 molecular proportions of a halide of an acid of the general formula

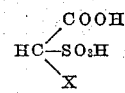

in which X indicates a chlorine or bromine atom.

Large numbers of dyestuffs of the formula set forth above are known, particularly as pigments produced on the fiber. As is also known they can be produced in substance in a simple manner by combination of diazo compounds which are free from solubilizing groups with coupling components which contain the atom grouping

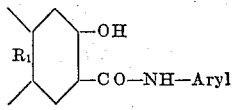

As diazo compounds there can be used in this case the diazotized bases which come into consideration in the customary manner for the manufacture of ice colors, for example 3-chloro-1-aminobenzene, 2:5 - dichloro-1-aminobenzene, 2-trifluoromethyl-4 - chloro-1-aminobenzene, 2-chloro-5-trifluoromethyl - 1 - aminobenzene, 2-ethyl - sulfone - 5 - trifluoromethyl-1-aminobenzene, 2-ethyl-sulfone-5-trifluoromethyl-1-aminobenzene, 3:5-di-(trifluoromethyl)-1-aminobenzene, 2-nitro-1-aminobenzene, 2-nitro-4-chloro-1-aminobenzene, 2-nitro-4-methyl-1-aminobenzene, 2 - nitro - 4 - methoxy-1-aminobenzene, 2-methoxy-5-nitro-1-aminobenzene, 2-methyl-4-chloro-1-aminobenzene, 2-methoxy-5-chloro-1-aminobenzene, 3:2'-dimethyl-4-amino-1:1'-azobenzene, 4-benzoylamino-5-methyl-2-methoxy-1-aminobenzene, 4-benzoylamino-2:5-diethoxy-1-aminobenzene and 1-aminonaphthalene.

Azo dyestuffs produced from such diazo compounds are of the general formula

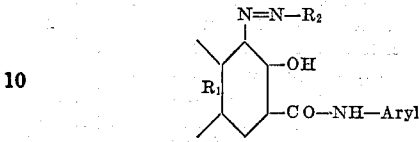

in which $R_1$ indicates a cyclic radical condensed with the benzene ring in the position indicated by the valence bonds and $R_2$ indicates the radical of a diazo component suitable for the manufacture of ice colors.

As coupling components, there can be employed for example the compounds of the general formula

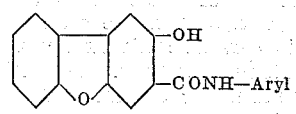

in particular those of the general formula

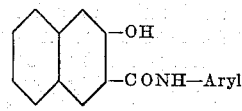

The latter coupling components give rise to azo dyestuffs of the general formula

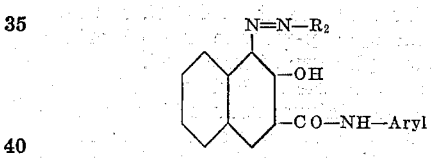

in which $R_2$ indicates the radical of a diazo-component suitable for the manufacture of ice colors.

In the above formulae the aryl radical can be for example a naphthalene radical bound to the —NH-group in 1- or 2-position or a radical of the benzene series as, for example phenyl, 2-methyl-phenyl, 2-methoxyphenyl, 4-chloro-2-methylphenyl, 2:5-dimethoxy - 4 - chlorophenyl, 2:4-dimethoxy-5-chlorophenyl and 2-methyl-4-methoxyphenyl.

As halides of acids of the general formula

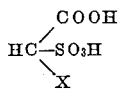

there come into consideration in the present process the halides, in particular the chloride of bromacetic acid sulfonic acid or advantageously chloracetic acid sulfonic acid.

For the present process there are suitable primarily those acid halides of the specified type which contain the group —CO-halogen, in particular the group —COCl, while the —SO₃H-group which is likewise capable of forming an acid halide need not be converted into the group —SO₂-halogen.

Acid halides of acids of the general formula set forth above, which are particularly suitable for the present process, can be produced by reacting the chlor- or bromacetic acid sulfonic acid (which compounds are obtained by interaction of the chlor- or bromacetic acid with sulfur trioxide) or the alkali salts thereof, with acid halides, advantageously those of simple configuration. Thus, for example the acids can be subjected to a treatment with an excess of thionyl chloride and when the reaction is complete the remaining excess of thionyl chloride distilled off. More suitably, the reaction can be carried out with the aid of aromatic sulfonic acid halides such as naphthalene-2-sulfonic acid chloride, benzene sulfochloride, p-chlorobenzene sulfochloride or p-toluene sulfochloride or, and this is particularly advantageous, by means of phosgene. As a rule (an exception is reaction with thionyl chloride) it is of advantage to carry out this reaction in the presence of a tertiary organic base, as for example trimethylamine, triethylamine, N-methyl-morpholine or advantageously pyridine. When the process is conducted in the absence of pyridine and in the presence of trimethylamine or triethylamine it is of advantage for the smooth course of the reaction in general to make an addition of an inert organic solvent such as benzene, chlorobenzene, o-dichlorobenzene, 1:2:4-trichlorobenzene, nitrobenzene or dioxane. These methods offer the additional advantage that the mixtures thus obtained containing halides of the chlor- or bromacetic acid sulfonic acid, can be employed directly for reaction with the dyestuffs in accordance with the present process.

Such mixtures are suitably produced in such a manner that in the first place the chlor- or bromacetic acid sulfonic acid is introduced into pyridine and thereupon at somewhat elevated temperature, for example at 30–40° C. the acid halide (for example p-toluene sulfochloride) added or gaseous phosgene introduced.

A particularly valuable acylating agent is obtained when to the mixture produced in the manner described above a further addition is made of a stronger tertiary base than pyridine, for example trimethylamine or advantageously triethylamine. Thus, for example a chlor- or bromacetic acid sulfonic acid may be mixed with pyridine, then the acid halide added or phosgene introduced and finally triethylamine also added. Alternatively the chlor- or bromacetic acid sulfonic acid may be brought together with one of the above specified inert solvents, triethylamine added and the acid halide or phosgene introduced.

The reaction mixtures thus obtained are valuable acylating agents which react in a very simple manner with the dyestuffs as above defined. For this purpose the dyestuffs concerned can simply be introduced into the mixture and the reaction according to the present process completed by gently heating, for example to about 60–100° C. It is also possible to mix the dyestuff and the chlor- or bromacetic acid sulfonic acid in either sequence with the tertiary base (for example, pyridine) and to add the aromatic sulfonic acid halide (for example p-toluene sulfochloride) or to introduce the phosgene, then if desired to manner, whether the reaction mixture still contains any starting material in that a test portion diluted with acidified water must no longer contain any water-insoluble dyestuff.

The working up of the reaction mixture can take place for example by pouring the whole after cooling into dilute mineral acid, for example sulfuric acid, precipitating the dyestuffs from the acid solution by addition of sodium chloride and isolating the same and if desired purifying by dissolving in weak dilute acid and reprecipitating with sodium chloride. If the reaction mixture contains an organic solvent difficultly soluble or insoluble in water this can be distilled off if desired under reduced pressure, for example after pouring into dilute mineral acid and addition of the sodium chloride.

The dyestuff derivatives obtained in accordance with the present process are new.

They contain the atom grouping

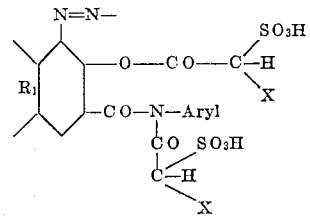

in which R₁ indicates a cyclic radical condensed with the benzene ring in the positions indicated by the valence bonds and X indicates a chlorine or bromine atom and they are free from further solubilizing groups.

According to the present knowledge (see also Helvetica Chimica Acta, vol. 24, Fasc. Extraord., pages 50–57) they correspond to the general formula

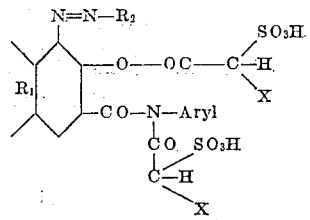

in which R₁ indicates a cyclic radical condensed with a benzene ring in the positions indicated by the valence bonds, R₂ indicates the radical of a diazo component suitable for the manufacture of ice colors and X a chlorine or bromine atom.

Particular dyestuffs within this group have the general formula

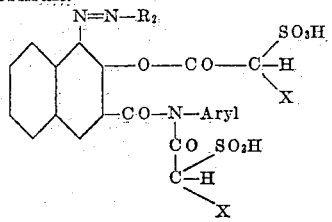

in which R₂ and X have the above significance.

The new dyestuff derivatives obtained according to the present process have the property of being relatively stable to dilute acids, particularly at lower temperatures. On the other hand even with weak alkalis they can be split up surprisingly easily, the insoluble initial dyestuff being reformed. Thus quite a short treatment with cold dilute aqueous ammonia solution suffices in order to reconvert these dyestuff derivatives substantially completely into the initial dyestuffs.

On account of these properties the new dyestuff derivatives obtained according to the present process constitute very valuable products which are suitable in particular for the production of textile dyeings, for example foulard dyeings and for application in textile printing.

Very valuable results are obtained when the prints obtainable in the customary manner with acid to neutral printing pastes which contain dyestuff derivatives produced according to the present process, are treated with alkalis, advantageously with ammonia. These alkali treatments can with advantage be effected with weak and dilute alkalis, if desired even with gaseous ammonia. The present invention accordingly also relates to a printing process as above set forth.

Dyestuff derivatives of similar composition to those obtainable according to the present process are described in French Patent No. 815,575 of August 1936, by Ciba Societe Anonyme, Basel, Switzerland. This French patent discloses a process for the manufacture of dyestuff derivatives by treating a dyestuff which contains at least one hydroxyl group and at least one solubilizing group. The resultant soluble derivatives of insoluble dyestuffs can be printed on textiles and the insoluble dyestuffs regenerated on the fiber by saponifying the acylating group of the soluble dyestuff derivative by means of alkalis. Printing by means of these known deystuff derivatives is, however, accompanied by certain difficulties owing to the fact that the saponification of these products generally requires some time. If attempts are made with prints produced with these known dyestuff derivatives, to effect saponification for example by treatment with alkalis, this saponification frequently takes place so slowly that the soluble dyestuff derivative has sufficient time to become dissolved out of the fiber. Owing to this fact not only do the originally printed portions lose color strength but the dyestuff derivative dissolved out often stains the unprinted portions. An attempt has been made to avoid this disadvantage of the known products by the process of French Patent No. 840,459 of July 8, 1938, by Ciba Societe Anonyme, Basel, Switzerland, in such a manner that the saponification is carried out in concentrated salt solutions, the object of the high salt content being to prevent the soluble dyestuff derivatives from being dissolved, or alternatively by rendering the dissolving out of the dyestuff derivatives more difficult by addition of small quantities of suitable salts which rapidly convert the soluble dyestuff derivatives into difficulty soluble metal compounds, as for example alkaline earth salts. These methods are, however, in all cases complicated and thus are unfamiliar to the dyer so that in practice they are out of the question.

Compared with these known methods the process in accordance with which the new products of the present invention are applied possesses the advantage that it is extremely simple to carry out. Both the printing process itself and also the saponification subsequently necessary can take place according to the customary working methods and apart from the new dyestuff derivatives no unfamiliar substances, no disproportionately large quantities of auxiliary materials and no special apparatus are necessary. In addition the easy saponifiability of the new dyestuff derivatives renders it possible to work very rapidly and smoothly and to preserve both the printed material and also the apparatus from damaging influences owing to the fact that neither high temperatures nor injurious reagents are necessary in the saponification.

The dyestuff derivatives described in French Patent No. 815,575 are moreover not always satisfactory for the dyeing of fibers of animal origin, in particular wool, since on account of their stability to alkalis they can only be saponified by a relatively energetic or prolonged alkali treatment, for example a treatment with alkali hydroxide solutions. The new dyestuff derivatives obtained according to the present process are on the other hand very well suited to the dyeing and printing of wool since on account of their relatively good stability to acids they can easily be dyed in the customary manner from an acid bath and then be reconverted on the wool fiber by a very mild treatment which in no way damages the wool, for example by short treatment in dilute cold ammonia solution, into the insoluble initial dyestuffs. Instead of employing an alkali treatment in the cold the azo dyestuff derivatives dyed in the customary manner, for example from a sulfuric acid bath, can also easily be saponified on the fiber by means of a more prolonged treatment in a neutral to acid medium in the hot, for example, at 95–100° C. Valuable dyeings are thereby obtained which may be distinguished primarily by good wet fastness and crocking fastness properties.

The following examples illustrate the invention, the parts and percentages being by weight unless otherwise stated and the relation between parts by weight and parts by volume being the same as that between the kilogram and the liter.

*Example 1*

60 parts of chloracetic acid sulfonic acid [produced according to Backer and Burgers (Journal of the Chemical Society, 127, page 234) from 1 molecular proportion of chloracetic acid and 1.1 molecular proportions of sulfur trioxide] are mixed with 400 parts by volume of dry pyridine with stirring. The chloracetic acid sulfonic acid first passes into solution in the pyridine with heating whereupon then a thick crystal paste is rapidly produced. Into this crystal paste at about 30–40° C., 36 parts of phosgene in the form of gas are passed in the space of about ½ to 1 hour as a result of which the white crystal mass gradually becomes converted into a brown oily product, whereupon then 30 parts of the azo dyestuff from diazotized 1-amino-naphthalene and (2' - hydroxy - 3' - naphthoylamino) -benzene are added. The mixture produced is now heated with stirring to 70–75° C. In a short time the pigment dyestuff passes into solution and the violet red color of the solution becomes changed to brown. A test portion of this reaction mixture has become soluble to a clear solution in water. After a reaction period of 20 minutes the reaction mixture is cooled to room temperature and then stirred into a cold mixture of 1500 parts of water and 210 parts of concentrated sulfuric acid. By the addition of 100 parts of sodium chloride the reaction product is salted out as a dark greasy mass. It corresponds to the formula

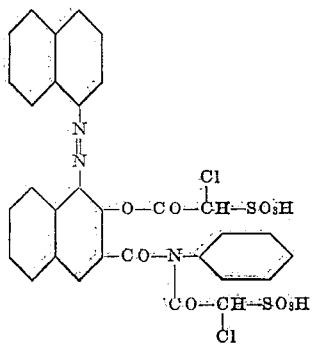

By heating to 40–50° C. the salted out reaction product becomes coherent and deposits on the bottom of the vessel so that the brown colored sulfuric acid-pyridine water can be effectively separated. The reaction product is then again dissolved in water with the addition of some dilute acetic acid and with gentle heating and then again salted out with sodium chloride. After drying in vacuum at 40–50° C., it constitutes a brown powder which dissolves easily and to a clear solution in water with a brown color. From the aqueous solution of the new acylation product on the addition of dilute alkalis the insoluble starting pigment again immediately separates.

*Example 2*

To the reaction mixture produced as described in Example 1 from 60 parts of chloracetic acid sulfonic acid, 400 parts by volume of dry pyridine and 36 parts of phosgene, at 30–40° C. are added 35 parts of the azo-dyestuff from diazotized 2:5-dichloro-1-aminobenzene and 1-(2'-hydroxy-3'-naphthoylamino)-2-methoxybenzene and the whole heated with stirring to 70–75° C. After a reaction period of 15–30 minutes the acylation is complete and a test portion of the reaction mixture has become soluble to a clear solution in water. The reaction mixture cooled to room temperature is then stirred into a mixture of 1500 parts of water and 210 parts of concentrated sulfuric acid, 100 parts of sodium chloride added and the whole heated to 40–50° C. so that the reaction product which separates as a resin coheres well together and is deposited. After decanting the acid pyridine water the residue is again dissolved by warming with 1000 parts of water and 24 parts by volume of 10 per cent acetic acid and salted out again with 150 parts of sodium chloride. After drying at 40–50° C. in vacuum the reaction product which corresponds to the formula

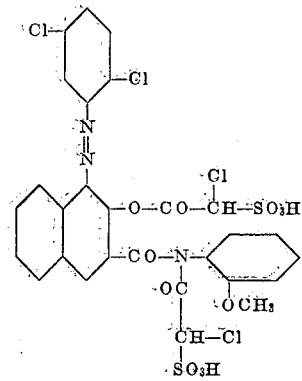

is a red brown powder which dissolves easily into a clear solution in water with a red brown color and on addition of dilute alkalis is immediately saponified again to the insoluble starting pigment.

*Example 3*

To the reaction mixture produced as described in Example 1 from 60 parts of chloracetic acid sulfonic acid, 400 parts by volume of dry pyridine and 36 parts of phosgene are added at 30–40° C., 32 parts of the azo-dyestuff from diazotized 3-chloro-1-amino-benzene and 1-(2'-hydroxy-3'-naphthoylamino)-2-methoxybenzene and the whole heated with stirring to 70–75° C. The acylation is complete after a reaction period of 15–30 minutes and a test portion of the reaction mixture has become soluble to a clear solution in water. The reaction mixture cooled to room temperature is then added to a mixture of 1500 parts of water and 210 parts of concentrated sulfuric acid with stirring, 100 parts of sodium chloride added and the whole heated to 40–50° C. whereupon the reaction product separated as a resin is effectively deposited. After decanting the acid pyridine water the residue is again dissolved with gentle heating in 1000 parts of water and 25 parts by volume of 10 per cent acetic acid and salted out again with 180 parts of sodium chloride. It corresponds to the formula

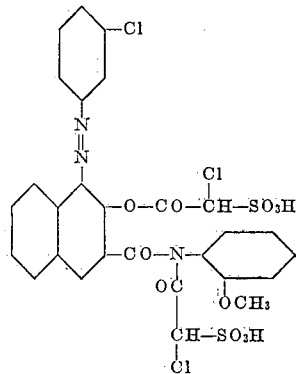

After drying at 40–50° C. in vacuum the reaction product constitutes a brown orange powder which dissolves easily to a clear solution in water with an orange color and after addition to dilute alkalis immediately reforms the insoluble starting pigment.

*Example 4*

2.1 parts of the azo dyestuff from diazotized 1-aminonaphthalene and (2'-hydroxy-3'-naphthoylamino)-benzene are mixed with 30 parts of dry pyrodine and thereupon 4.4 parts of chloracetic acid sulfonic acid and 4.75 parts of p-toluene sulfonic acid chloride added. The reaction mixture is then heated with stirring to 70–80° C. After a reaction period of 15 minutes the violet red coloration of the reaction solution has changed to brown and a test portion of the reaction mixture has become soluble to a clear solution in water. The reaction mixture cooled to room temperature is poured with stirring into a mixture of 150 parts of water and 18 parts of concentrated surfuric acid, the reaction product salted out completely in resinous form with sodium chloride, heated somewhat and the pyridine water then decanted off. The residue is dissolved again in 100 parts of water with addition of some 10 per cent acetic acid, salted out again with sodium chloride and dried in vacuum at 40–50° C. The reaction product constitutes a bordeaux colored powder which dissolves easily to a clear solution in water and with a dilute alkali immediately separates again the insoluble starting pigment.

The same product is obtained if the p-toluene sulfonic acid chloride is replaced by an equivalent quantity of napthalene-2-sulfonic acid chloride or p-chlorobenzene sulfonic acid chloride.

*Example 5*

4.4 parts of chloracetic acid sulfonic acid are mixed with stirring with 30 parts by volume of dry pyridine as a result of which after dissolution of the chloracetic acid sulfonic acid a light colored crystal paste is produced. During this operation the temperature rises to 40–60° C. To this crystal paste 4.5 parts of benzene sulfonic acid chloride are added at 35–45° C. whereupon a clear solution is again produced. 2.1 parts of the azo dyestuff from diazotized 1-aminonaphthalene and (2'-hydroxy-3'-naphthoylamino)-benzene are added to the reaction solution and the whole heated with stirring to 70–75° C. After a short reaction period the acylation is complete and a test portion of the reaction mixture has become soluble to a clear solution in water. The reaction product isolated in the same manner as described in Example 4 is identical with the product of that example.

*Example 6*

60 parts of chloracetic acid sulfonic acid are mixed with 400 parts by volume of dry pyridine, to the crystal paste produced 35 parts of the azo dyestuff from diazotized 2:5-dichloro-1-aminobenzene and 1-(2'-hydroxy-3'-naphthoylamino)-2-methoxybenzene added at 30–40° C. and then at the same temperature 36 parts of phosgene introduced. When the absorption of the phosgene is complete the reaction mixture is heated to 60–70° C. whereby after a reaction period of about 10–20 minutes the pigment has passed into solution and the acylation is complete. A test portion of the brown reaction mixture has become soluble to a clear solution in water. The reaction mixture cooled to room temperature is now poured with stirring into a mixture of 1500 parts of water and 210 parts of concentrated sulfuric acid, 100 parts of sodium chloride added and the whole heated to 40–50° C., whereby the reaction product which separates as a resin is effectively deposited. After decanting the acid pyridine-water the residue is dissolved with gentle heating in 1000 parts of water and 25 parts by volume of 10 per cent acetic acid and salted out again with 150 parts of sodium chloride and dried in vacuum at 40–50° C. It constitutes a red brown powder which is easily soluble to a clear solution in water with a red brown color and after the addition of dilute alkalis immediately splits off again the insoluble starting pigment.

*Example 7*

60 parts of chloracetic acid sulfonic acid are mixed with 400 parts by volume of dry pyridine, 35 parts of the azo dyestuff from diazotized 2:5-dichloro-1-aminobenzene and 1-(2'-hydroxy-3'-naphthoylamino)-2-methoxybenzene added and 33 parts of phosgene introduced at 65–70° C. By this means the pigment gradually dissolves and at the end of the reaction a test portion of the reaction mixture is soluble to a clear solution in water. The reaction mixture cooled to room temperature is then added with stirring to a mixture of 1500 parts of water and 210 parts of concentrated sulfuric acid, 100 parts of sodium chloride added and the whole heated to 40–50° C. whereupon the reaction product which separates as a resin is effectively deposited. After decanting the acid pyridine water the residue is dissolved with gentle heating in 1000 parts of water and 25 parts by volume of 10 per cent acetic acid and salted out again with 150 parts of sodium chloride. After drying at 40–50° C. the reaction product constitutes a red brown powder which is easily soluble to a clear solution in water with red brown color and after the addition of dilute alkalis immediately splits off again the insoluble starting pigment.

*Example 8*

4.4 parts of chloracetic acid sulfonic acid are mixed with 40 parts by volume of dry pyridine, to the crystal paste produced 5 parts of p-toluene sulfonic acid chloride added and after the reaction is complete a further addition made of 10.3 parts of dry triethylamine and 2.9 parts of the azo dyestuff from diazotized 4-benzoylamino-2:5-diethoxy-1-aminobenzene and (2'-hydroxy-3'-naphthoylamino)-benzene added. The mixture obtained is then heated with stirring to 90–95° C. whereby after a reaction period of 15–30 minutes the acylation is complete and a test portion of the reaction mixture has become soluble to a clear solution in acidified water. The reaction mixture cooled to room temperature is now poured with stirring into a mixture of 150 parts of water and 26 parts of concentrated sulfuric acid, 10 parts of sodium chloride added and the whole heated to 40–50° C. whereby the reaction product which separates as a resin is effectively deposited. After decanting the acid pyridine-triethylamine-water the residue is dissolved in 200 parts of water and 5 parts by volume of 10 per cent acetic acid and salted out again with 30 parts of sodium chloride. The reaction product which separates in solid form is filtered off and dried in vacuum at 40–50° C. It corresponds to the formula

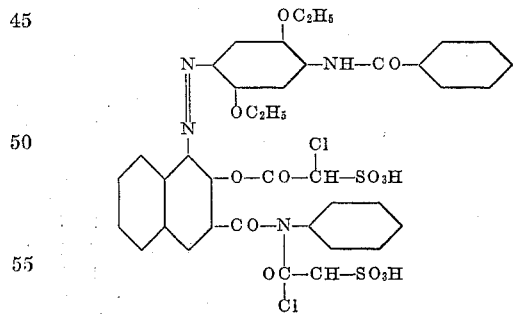

and constitutes a black brown powder which is easily soluble to a clear solution in water with deep brown color and after the addition of dilute alkalis immediately splits off again the insoluble blue starting pigment.

*Example 9*

6 parts of chloracetic acid sulfonic acid are mixed with 30 parts by volume of dry pyridine, to the crystal paste thus produced 2.9 parts of the azo dyestuff from diazotized 4-benzoylamino-2:5-diethoxy - 1-aminobenzene and (2'-hydroxy-3'-naphthoylamino)-benzene added and then the further addition made of 6.5 parts of p-toluenesulfonic acid chloride and 26 parts of a 23.2 per cent. trimethylamine solution in pyridine. The reaction mixture obtained is then heated with stirring to 90–95° C. whereby after ½ to 1 hour reaction period the acylation is complete and a test portion of the reaction mixture has become soluble to a clear solution in acidified water. The reaction mixture cooled to room temperature is now poured with stirring into a mixture of 200 parts of water and 31 parts of concentrated sulfuric acid, 15 parts of sodium chloride added and the whole heated to 40–50° C. whereby the reaction product which separates as a resin is effectively deposited. After decanting the acid pyridine-trimethylamine-water the residue is dissolved in 200 parts of water and 5 parts by volume of 10 per cent. acetic acid and salted out again with 40 parts of sodium chloride. The reaction product which separates in solid form is filtered with suction and dried in vacuum at 40–50° C. The reaction product obtained corresponds to the product of Example 8.

*Example 10*

4.4 parts of chloracetic acid sulfonic acid are mixed with 40 parts by volume of dry pyridine, into the crystal paste produced 2.9 parts of the azo dyestuff from diazotized 4-benzoylamino-2:5-diethoxy-1-aminobenzene and (2'-hydroxy-3'-naphthoylamino)-benzene introduced and then the further addition made of 10.3 parts of triethylamine. Into this reaction mixture at 30–40° C., 2.6 parts of phosgene are introduced and the whole is then heated with stirring to 90–95° C. After a reaction period of 10–20 minutes the acylation is complete and a test portion of the reaction mixture has become soluble to a clear solution in acidified water. The isolation of the reaction product takes place according to the directions of Example 8 and the product obtained is identical with the product of Example 8.

*Example 11*

6 parts of chloracetic acid sulfonic acid are mixed with 40 parts by volume of dry pyridine, into the crystal paste thus produced 3 parts of the azo-dyestuff from diazotized 4-benzoylamino-2:5-diethoxy-1-aminobenzene and 1-(2'-hydroxy-3'-naphthoyl-amino)-2-methoxybenzene introduced and then the further addition made of 10.3 parts of triethylamine and 6.5 parts of p-toluene-sulfonic acid chloride. The mixture obtained is heated with stirring to 80–90° C. whereby after a reaction period of 10–20 minutes the acylation is complete and a test portion of the reaction mixture has become soluble to a clear solution in acidified water. The reaction mixture cooled to room temperature is now poured with stirring into a mixture of 150 parts of water and 26 parts of concentrated sulfuric acid, 10 parts of sodium chloride added and the whole heated to 40–50° C. whereby the reaction product which separates as a resin becomes effectively deposited. After decanting the acid pyridine-triethylamine-water the residue is dissolved in 200 parts of water and 5 parts by volume of 10 per cent acetic acid and salted out again with 70 parts of sodium chloride. The reaction product separated in solid form is filtered with suction and dried in vacuum at 40–50° C. It constitutes a dark brown powder which dissolves very easily to a clear solution in water with a brown color and after an addition of dilute alkalis rapidly splits off again the insoluble violet blue starting pigment.

*Example 12*

6 parts of chloracetic acid sulfonic acid are mixed with 40 parts by volume of dry pyridine, into the crystal paste produced 3.5 parts of the azo-dyestuff from diazotized 2-methoxy-5-chloro-1-aminobenzene and 1-(2'-hydroxy-3'-naphthoylamino)-2-methoxybenzene introduced and then 10.75 parts of triethylamine also added. Into this reaction mixture 3.6 parts of phosgene are introduced at 30–40° C. and the whole is then heated with stirring to 90–95° C. After a reaction period of 15–30 minutes the acylation is complete and a test portion of the reaction mixture has become soluble to a clear solution in acidified water. The reaction mixture cooled to room temperature is now poured with stirring into a mixture of 150 parts of water and 26 parts of concentrated sulfuric acid, 10 parts of sodium chloride added and the whole heated to 40–50° C. whereby the reaction product which separates as a resin is effectively deposited. After decanting the acid pyridine-triethylamino-water the residue is dissolved in 200 parts of water and 5 parts by volume of 10 per cent. acetic acid and salted out again with 40 parts of sodium chloride. Thereupon the reaction product separated from the aqueous salt solution is dried in vacuum at 40–50° C. It corresponds to the formula

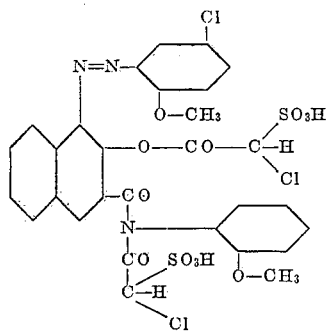

and constitutes a red powder which is easily soluble to a clear solution in water with a red color and with dilute alkalis immediately splits off again the insoluble red starting pigment.

*Example 13*

6 parts of chloracetic acid sulfonic acid are mixed with 40 parts by volume of dry benzene, 14.5 parts of triethylamine introduced and then 6.5 parts of p-toluene-sulfonic acid chloride also added. Into this mixture are thereupon introduced with stirring 3.5 parts of the azo-dyestuff from diazotized 2:5-dichloro-1-amino-benzene and 1 - (2' - hydroxy - 3' - naphthoylamino) -2-methoxybenzene and the reaction mixture is then heated to 70–75° C. After a reaction period of 15–30 minutes the acylation is completely finished and the dyestuff pigment has become soluble to a clear solution in acidified water. The reaction mixture cooled to room temperature is now introduced with stirring into a mixture of 150 parts of water, 2 parts of concentrated sulfuric acid and 20 parts of sodium chloride, the solution neutralized with 5 parts by volume of 10 per cent sodium acetate solution and thereupon the benzene distilled off under reduced pressure at 40–50° C. After cooling the aqueous solution is decanted off from the reaction product which has separated as a resin and is deposited on the bottom of the vessel, the product is dissolved in 150 parts of water and 3 parts of 10 per cent acetic acid and salted out again with 30 parts of sodium chloride. The reaction product separated in solid form at about 40–50° C. is filtered with suction and dried in vacuum at 40–50° C. It constitutes an orange red powder which dissolves readily to a clear solution in water with an orange color and after addition of dilute alkalis is immediately saponified to the insoluble starting pigment.

*Example 14*

6 parts of chloracetic acid sulfonic acid are mixed with 40 parts by volume of dry benzene, 15 parts of triethylamine introduced and then 3.5 parts of the azo dyestuff from diazotized 2:5-dichloro-1-aminobenzene and 1-(2'-hydroxy-3'-naphthoylamino) - 2 - methoxybenzene added. Into this reaction mixture at 30–40° C., 3.6 parts of phosgene are introduced and the whole is thereupon heated to 70–75° C. with stirring. After a reaction period of ½ to 1 hour the acylation is complete and the dyestuff has become soluble in water. The isolation of the reaction product takes place as described in Example 13.

*Example 15*

6 parts of chloracetic acid sulfonic acid are mixed with 40 parts by volume of nitrobenzene, 14.5 parts of triethylamine introduced and then 6.5 parts of p-toluene sulfonic acid chloride also added. Into this mixture are then introduced 1.2 parts of the azo-dyestuff from diazotized 4-benzoylamino-2:5-diethoxy-1-aminobenzene and (2'-hydroxy-3'-naphthoylamino)-benzene and the reaction mixture then heated with stirring to 60–70° C. The acylation takes place very rapidly and after a short reaction period the dyestuff pigment has become soluble in water. The reaction mixture cooled to room temperature is stirred into a mixture of 400 parts of water and 10 parts of glacial acetic acid, the nitrobenzene extracted with benzine and the aqueous dyestuff solution then separated. From the aqueous solution the reaction product is salted out in solid form with sodium chloride, filtered off, again dissolved in 200 parts of water and 3 parts by volume of 10 per cent acetic acid and salted out again with sodium chloride. After drying in vacuum at 40–50° C. it constitutes a dark brown powder which is readily soluble to a clear solution in water with dark brown color and with dilute alkalis is rapidly split up again to the blue starting pigment.

Instead of nitrobenzene the reaction can also be carried out in dioxane, toluene or chlorobenzene with the same result. Likewise instead of using p-toluenesulfonic acid chloride the reaction can be carried out with phosgene.

*Example 16*

0.5 part of chloracetic acid chloride sulfonic acid, which has been obtained by treatment of chloracetic acid sulfonic acid with excess of thionyl chloride and distilling off the excess of the thionyl chloride when the reaction is complete, is mixed with 4 parts by volume of dry benzene, 1 part of triethylamine introduced and then 0.2 part of the azo-dyestuff from diazotized 1-aminonaphthalene and (2'-hydroxy-3'-naphthoylamino)-benzene added. The reaction mixture obtained is then heated with stirring to 70–80° C. whereby after ½ to 1 hour reaction period the acylation is complete and a test portion of the reaction product has become soluble in acidified water. On saponification with dilute alkalis the insoluble starting pigment is again immediately obtained.

*Example 17*

0.5 part of chloracetic acid sulfonic acid is mixed with 4 parts by volume of N-methyl-morpholine, 0.6 part of p-toluene sulfonic acid chloride introduced and then 0.10 part of the azo dyestuff from diazotized 1-aminonaphthalene and (2' - hydroxy - 3' - naphthoylamino) - benzene added. The reaction mixture obtained is then heated with stirring to 80–90° C. whereby after 1–2 hours' reaction period the acylation is complete and a test portion of the reaction product has become soluble in acidified water.

In the same manner the acylation can also be carried out by the addition of 1.25 parts of triethylamine or with a mixture of 4 parts by volume of benzene and 1.5 parts of N-methyl morpholine.

*Example 18*

15 parts of chloracetic acid sulfonic acid are mixed with 100 parts by volume of dry pyridine, 7.6 parts of the azo dyestuff from diazotized 4-chloro - 2 - methyl - 1 - aminobenzene and 2-hydroxy-diphenylene oxide-3-carboxylic acid-2':5'-dimethoxyanilide added and then at 30–40° C., 9 parts of phosgene introduced. After the phosgene has been taken up the reaction mixture is heated to 75–80° C. whereby after about 10–20 minutes' reaction period the pigment has passed into solution and the acylation is complete. A test portion of the reaction mixture has become soluble to a clear solution in water. The reaction mixture cooled to room temperature is now poured with stirring into a mixture of 375 parts of water and 52.5 parts of concentrated sulfuric acid, 25 parts of sodium chloride introduced and the whole heated to 40–50° C. whereby the reaction product which separates as a resin is effectively deposited. After decanting the acid pyridine water the residue is dissolved in 300 parts of water and salted out again with 30 parts of sodium chloride. The reaction product separated in solid form is filtered with suction and dried in vacuum at 40–50° C. It corresponds to the formula

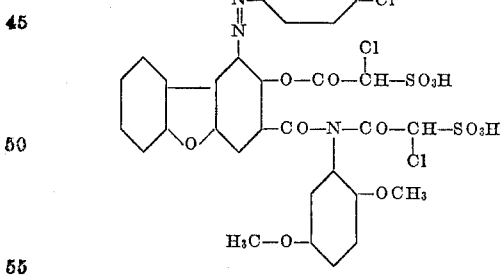

and constitutes a brown orange powder which dissolves readily to a clear solution in water with brown-orange color and after the addition of dilute alkalis immediately deposits the insoluble black-brown pigment.

*Example 19*

6.6 parts of bromacetic acid-sulfonic acid [produced according to Backer, Rec. 44, 1058 (1925)] are mixed with 40 parts by volume of dry pyridine with stirring and on heating almost complete solution achieved. To this reaction mixture are added at about 30–40° C., 3 parts of the azo-dyestuff from diazotized 3-chloro-1-aminobenzene and 1-(2'-hydroxy-3'-naphthoylamino)-2-methoxybenzene and 6.5 parts of p-toluene sulfochloride and the whole is then heated to 80–90° C. with stirring. In a short time the pigment passes into solution and after a reaction period of 5–15 minutes a test portion of the reaction mixture has become soluble to a clear solution in water. The reaction mixture cooled to room temperature is now poured with stirring into a mixture of 150 parts of water and 21 parts of concentrated sulfuric acid, 10 parts of sodium chloride added and the whole heated to 40-50° C. whereby the reaction product which separates a resin becomes effectively deposited. After decanting the acid pyridine-water the residue is dissolved in 100 parts of water, salted out again with 20 parts of sodium chloride and after separation of the salt solution dried in vacuum at 40-50° C. The reaction product corresponds to the formula

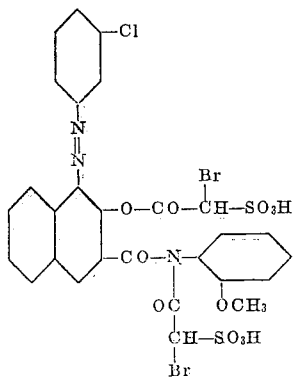

It is an orange brown powder which dissolves readily to a clear solution in water with orange brown color and after addition of dilute alkalis gives again the insoluble starting pigment.

*Example 20*

A dyebath is produced consisting of 3 parts of the reaction product of chloracetic acid sulfonic acid and phosgene on the azo dyestuff from diazotized 2:5-dichloro-1-aminobenzene and 1-(2' - hydroxy - 3' - naphthoylamino) - 2 - methoxybenzene, 3000 parts of water and 20 parts of 10 per cent. sulfuric acid. At about 40° C., 100 parts of well wetted wool are entered, the bath heated gradually to boiling and dyeing carried out at the boil for about 15-30 minutes. During this time the dyestuff takes practically completely on the wool. The dyeing is now finished either by adding to the dyebath 1-2 parts of crystalline sodium acetate and boiling again for about ½ hour or by moving the dyeing for a short time in a cold 1-2 per cent. ammonia solution. The wool is then rinsed and dried; it is dyed a vivid scarlet red.

*Example 21*

A printing paste is produced consisting of

|  | Parts |
|---|---|
| The reaction product (obtainable according to Example 2) of chloracetic acid sulfonic acid and phosgene on the azo-dyestuff from diazotized 2:5-dichloro-1-aminobenzene and 1-(2'-hydroxy-3'-naphthoylamino)-2-methoxybenzene | 80 |
| 10 per cent. acetic acid | 100 |
| Water | 220 |
| Thiodiglycol | 100 |
| Neutral starch-tragacanth thickening | 500 |
|  | 1000 |

This printing paste is printed on a cotton fabric and dried. Thereupon the print can also be steamed for 3-10 minutes in the Mather-Platt. The print is now developed by short passage (about 1 minute) through a 1-2 per cent. ammonia solution. It is then malted and soaped at the boil. There is thus obtained a beautiful vivid scarlet print.

*Example 22*

A printing paste is produced consisting of

|  | Parts |
|---|---|
| The reaction product (obtainable according to Example 8) of chloracetic acid sulfonic acid and p-toluene sulfonic acid chloride on the azo dyestuff from diazotized 4-benzoylamino - 2:5 - diethoxy - 1 - aminobenzene and (2'-hydroxy-3'-naphthoylamino)-benzene | 40 |
| 10 per cent. acetic acid | 100 |
| Water | 260 |
| Thiodiglycol | 100 |
| Neutral starch tragacanth thickening | 500 |
|  | 1000 |

This printing paste is printed on a cotton fabric and dried. The print is with advantage then steamed for 3-10 minutes in the Mather-Platt. The print is developed by a short passage (about 1 minute) through a 1-2 per cent. ammonia solution. It is then malted and soaped at the boil. A beautiful strong blue print is thus obtained.

*Example 23*

A printing paste is produced consisting of

|  | Parts |
|---|---|
| The reaction product (obtainable according to Example 12) of chloracetic acid sulfonic acid and phosgene on the azo dyestuff from diazotized 2-methoxy-5-chloro-1-aminobenzene and 1 - (2' - hydroxy-3'-naphthoylamino)-2-methoxybenzene | 80 |
| 10 per cent. acetic acid | 100 |
| Water | 220 |
| Thiodiglycol | 100 |
| Neutral starch tragacanth thickening | 500 |
|  | 1000 |

This printing paste is printed on a cotton fabric and dried. Thereupon the material may with advantage be steamed for 3-10 minutes in the Mather-Platt. The print is then developed by short passage (about 1 minute) through a 1-2 per cent. ammonia solution. It is then malted and soaped at the boil. A beautiful strong red print is obtained in this manner.

*Example 24*

A printing paste is produced consisting of

|  | Parts |
|---|---|
| The reaction product (obtainable according to Example 13) of chloracetic acid sulfonic acid and p-toluene sulfonic acid chloride on the azo dyestuff from diazotized 2:5-dichloro-1-aminobenzene and 1 - (2' - hydroxy - 3' - naphthoylamino) - 2-methoxybenzene | 80 |
| 10 per cent. acetic acid | 100 |
| Water | 220 |
| Thiodiglycol | 100 |
| Neutral starch tragacanth thickening | 500 |
|  | 1000 |

This printing paste is printed on a cotton fabric and dried. Thereupon the material may with advantage be steamed for 3-10 minutes in the Mather-Platt. The print is then developed by suspending it for a few minutes in a box containing ammonia gas. It is then malted and soaped at the boil. In this manner a strong vivid scarlet print is obtained.

What we claim is:

1. An azo-dyestuff derivative corresponding to the formula

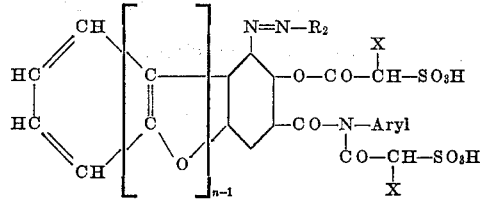

in which $n$ is an integer which is at most 2, Aryl represents a system of aromatic carbon rings comprising only 6-membered rings of which at most two are condensed, $R_2$ stands for the radical of a diazo component suitable for the manufacture of ice colors, and X stands for a halogen atom selected from the group consisting of chlorine and bromine, and which is free from further groups imparting solubility in water.

2. An azo-dyestuff derivative corresponding to the formula

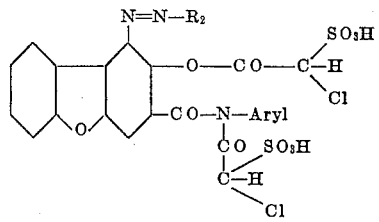

in which $R_2$ stands for the radical of a diazo component suitable for the manufacture of ice colors, Aryl represents a system of aromatic carbon rings comprising only 6-membered rings of which at most two are condensed, and which is free from further groups imparting solubility in water.

3. An azo-dyestuff derivative corresponding to the formula

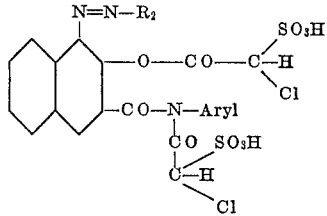

in which $R_2$ stands for the radical of a diazo component suitable for the manufacture of ice colors, Aryl represents a system of aromatic carbon rings comprising only 6-membered rings of which at most two are condensed, and which is free from further groups imparting solubility in water.

4. An azo-dyestuff derivative corresponding to the formula

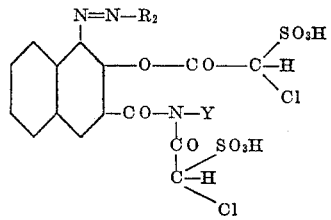

in which $R_2$ stands for the radical of a diazo component suitable for the manufacture of ice colors and Y stands for a member selected from the group consisting of a benzene and a naphthalene radical, and which is free from further groups imparting solubility in water.

5. The azo-dyestuff derivative corresponding to the formula

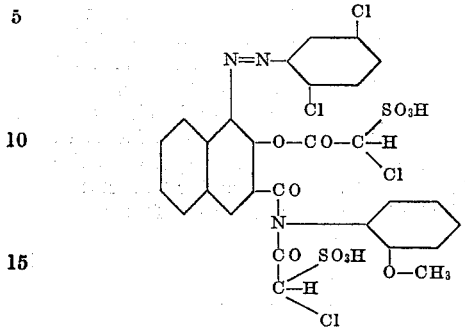

6. The azo-dyestuff derivative corresponding to the formula

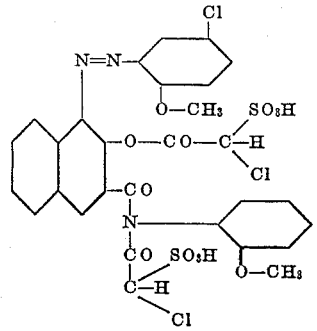

7. The azo-dyestuff derivative corresponding to the formula

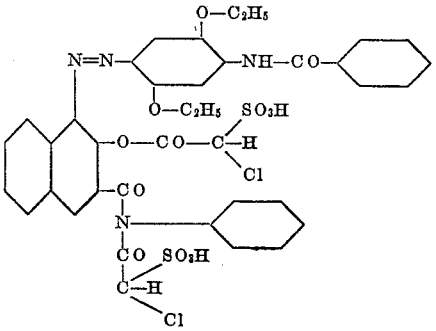

8. Process for the manufacture of an azo-dyestuff derivative, which comprises reacting 1 molecular proportion of an azo-dyestuff which is free from groups imparting solubility in water and corresponds to the formula

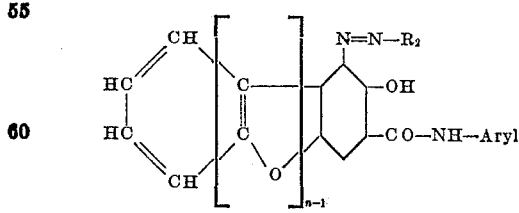

in which $n$ is an integer which is at most 2, Aryl represents a system of aromatic carbon rings comprising only 6-membered rings of which at most two are condensed, and $R_2$ stands for the radical of a diazo component suitable for the manufacture of ice colors, with at least two molecular proportions of a halide of an acid of the formula

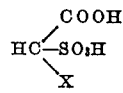

in which X stands for a halogen atom selected from the group consisting of chlorine and bromine.

9. Process for the manufacture of an azo-dyestuff derivative which comprises reacting with at least 2 molecular proportions of a member of the group consisting of an aromatic sulfonic acid halide and phosgene, a mixture containing in a tertiary organic base, at least 2 molecular proportions of a member of the group consisting of chloro-acetic acid sulfonic acid and bromo-acetic acid sulfonic acid, and one molecular proportion of a dyestuff which corresponds to the formula

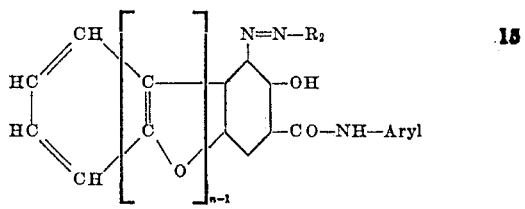

in which $n$ is an integer which is at most 2, Aryl represents a system of aromatic carbon rings comprising only 6-membered rings of which at most two are condensed, and R stands for the radical of a diazo component suitable for the manufacture of ice colors.

CHARLES GRAENACHER.
HEINRICH BRUENGGER.

No references cited.